(12) United States Patent
Teller et al.

(10) Patent No.: US 10,738,746 B1
(45) Date of Patent: Aug. 11, 2020

(54) DUAL PISTON VALVE FOR FLOW CONTROL OF TWO DISTINCT LIQUID FUELS

(71) Applicants: Abel R. Teller, Albuquerque, NM (US); Claude D. Convisser, Santa Fe, NM (US)

(72) Inventors: Abel R. Teller, Albuquerque, NM (US); Claude D. Convisser, Santa Fe, NM (US)

(73) Assignee: ALAFEI FOODS LIMITED, Tamale, Northern Region (GH)

( * ) Notice: Subject to any disclaimer, the term of this patent is extended or adjusted under 35 U.S.C. 154(b) by 56 days.

(21) Appl. No.: 15/331,799

(22) Filed: Oct. 21, 2016

Related U.S. Application Data

(63) Continuation-in-part of application No. 14/475,551, filed on Sep. 2, 2014, now abandoned.

(51) Int. Cl.
| | |
|---|---|
| *F02M 43/04* | (2006.01) |
| *F02M 61/04* | (2006.01) |
| *F02B 3/08* | (2006.01) |
| *F02M 53/04* | (2006.01) |

(52) U.S. Cl.
CPC ............. *F02M 43/04* (2013.01); *F02B 3/08* (2013.01); *F02M 53/04* (2013.01); *F02M 61/042* (2013.01)

(58) Field of Classification Search
CPC ........ F02M 43/04; F02M 43/00; F02M 43/02; F02M 53/04; F02M 53/043; F02M 53/06; F02M 61/04; F02M 61/042
See application file for complete search history.

(56) References Cited

U.S. PATENT DOCUMENTS

| | | | | |
|---|---|---|---|---|
| 3,561,481 A * | 2/1971 | Taplin | ................ | G05D 11/003 137/625.4 |
| 6,035,837 A * | 3/2000 | Cohen | ................ | F02D 19/0628 123/27 GE |
| 7,874,310 B1 * | 1/2011 | Jansen | ................ | F01D 25/12 137/340 |
| 2007/0144523 A1 * | 6/2007 | Bolam | ................ | F16K 11/0712 128/205.24 |

* cited by examiner

*Primary Examiner* — Jacob M Amick
(74) *Attorney, Agent, or Firm* — Birch, Stewart, Kolasch & Birch, LLP

(57) ABSTRACT

A dual piston valve system of a fuel system of a compression ignition engine to control and contain two distinct liquid fuels available to the valve at low pressure while allowing full flow through the valve of whichever one of the fuels is selected and preventing any cross leakage between the fuels.

15 Claims, 10 Drawing Sheets

DUAL PISTON VALVE FOR FLOW CONTROL OF TWO DISTINCT LIQUID FUELS

CROSS REFERENCE TO RELATED APPLICATIONS

This application is a Continuation-in-Part of U.S. patent application Ser. No. 14/475,551, filed on Sep. 2, 2014, which claims priority to and the benefit of U.S. Provisional Patent Application No. 61/873,788, entitled, "Valve Method and System for Control of Flow and Location of at Least Two Distinct, Non-gaseous, Liquid Fluids at Low Pressure, One of Which May Be at High Temperature and a Biofuel," filed on Sep. 4, 2013, the disclosures of which are incorporated herein by reference in their entirety.

FIELD OF THE INVENTION

Embodiments of the present invention relate to the field of control of fluids, and more specifically to selecting between or among two distinct fluids available to a valve, more specifically, to selecting between or among two distinct liquid fluid fuel supplies to a compression ignition (diesel) engine.

BACKGROUND OF THE INVENTION

Control of gaseous or liquid fluid flow and location within the operating specifications of valve seals requires use of certain materials that will not corrode or whose performance will not otherwise deteriorate due to the temperature or chemical composition of the fluid. For example, seals or O-rings have only certain temperature ranges, depending on the material of their composition, in which they are capable of performing their function of preventing leakage, cross-contamination, and failure due to inability to control fluid flow and location. Similarly, some seals or O-rings are not chemically compatible with certain kinds of fluids.

To control and contain fluid flow as desired when two or more different or distinct fluids are available to a valve, positive flow control is obtained by a complete shut-off by the valve piston as between the two different or distinct fluids. Depending on the means of force being applied to the valve piston, control of the fluid flow may also allow a specified portion of the fluid available to the valve to pass through it. If two or more different fluids are available to the valve, control and containment of the fluid flow may allow specified and controlled percentages of the full flow of each separate fluid to pass through the valve concurrently.

The three most common types of valve that are used to select as between or among two or more different or distinct liquid fluids available to the valve are: spool, ball and poppet valves.

A spool valve, which is used in hydraulic applications, may not be capable of forming a positive stop as between two or more different or distinct fluids available to the valve because it relies on mechanical tolerance between two different surfaces to attempt to do the sealing, rather than using an actual seal or O-ring. Therefore, a spool valve allows leakage and does not form a complete shut-off by the valve piston, as evidenced by the fact that commercial spool valves come with a leakage specification. The higher the temperature, the less viscous liquid fluids are likely to become, thereby making a complete shut-off by the spool valve piston even more problematic. Spool valves rely on high pressure to move liquid fluids. They do not have a free flow design for the liquid fluids that pass through them.

An opened ball valve does not have any restriction on the fluid that passes through it; it allows full flow of fluid passing through it. A non-motorized, three port, two position, ball valve cannot normally be driven by a solenoid because the stroke of a solenoid is not sufficiently long to cause the ball valve to engage in its complete sweep for selection between ports. Without a solenoid or motor, a non-motorized ball valve will not return to a default position when electrical power is removed, whereas a solenoid-driven valve will return to a default position. A motorized ball valve requires electrical power at all times to move; if electrical power is cut, then the motorized ball valve will not revert to a pre-determined default position. If electrical power is cut to a motorized ball valve, it will remain in its last position and two or more fluids available to the valve will continue to communicate with each other in the cavity or fluid passageway of the valve, as they were before electrical power was cut. If electrical power is cut unintentionally, the foregoing condition may leave the motorized ball valve in an undesired position and have other, unintended consequences.

A poppet valve is not a full flow valve, but it allows for a higher flow rate within its cavity or fluid passageway than does a spool valve of comparable diameter or aperture. Like a non-motorized ball valve, a poppet valve forms a positive stop as between and among two or more different and distinct fluids available to the valve. Unlike a ball valve, a poppet valve can be driven by a solenoid because its piston requires relatively small movement and only a short stroke. A poppet valve made in part of plastic material will not withstand higher temperatures and may deteriorate and fail if the fluid passing through it attains such temperatures. Commercially available poppet valves generally contain some plastic components.

If the portion of the valve control or selector rod, also known as the plunger, passing through the valve's cavity or fluid passageway, to which one or more valve pistons are attached or of which the valve pistons form a part, is made of a material such as mild steel, copper or brass, it may oxidize and corrode in the presence of certain liquid fluids, thus diminishing performance, contaminating the fluid liquid passing through it, and perhaps leading to a failure of functionality. If the portion of the valve control or selector rod that passes through the valve cavity or fluid passageway is made preferably of stainless steel, the chance for oxidation and corrosion will be minimized. If the liquid fluid consists of triglycerides, fatty acids, biodiesel (whether it meets ASTM Standard Specification 6751 or not), non-ester renewable diesel, hydro-processed esters and fatty acids, biojet fuel, or other biofuel, the portion of the valve control or selector rod that passes through the valve cavity or fluid passageway may also alternately and preferably be made of aluminum to minimize oxidation, contamination of the liquid fluid, and corrosion, though this portion of the valve control or selector rod can preferably and alternatively be made of more costly stainless steel. Triglycerides include the following substances: plant oil, pure plant oil, plant hydrocarbon oil, vegetable oil, fruit oil, animal fat, tallow, straight vegetable oil, waste vegetable oil, recycled vegetable oil, cooking oil, used cooking oil, yellow grease, and brown grease.

If the valve has hose clamp fittings, rather than JIC (Joint International Council) or NPT (National Pipe Thread) connectors, then it cannot be adapted to and used with more robust, industrial hosing and fittings. Commercially available valves typically have seals comprised of either silicon, nitrate or rubber. Silicon, nitrate and rubber seals are commonly used in valves but are not compatible with certain liquid fluids. For instance, rubber seals, when exposed to too low a level of aromatics in petroleum fuel or other fuel, will dry out, shrink and lose their sealing capability. Seals made of a fluoropolymer elastomer such as VITON® are more durable at higher temperatures than nitrate and rubber seals, are more resistant to some chemicals and solvents, and are fully compatible with biofuels, including triglycerides, fatty acids, and biodiesel. Biofuels run through a two-position, three-port valve, as one of two distinct fuels available to the valve, may need to be heated to reduce their viscosity prior to fuel injection. The valve body, if made of a material such as metal that efficiently conducts heat or cold, may perform the function of thermal transfer to the biofuel.

With regards to a solenoid operated valve, the portion of the valve control or selector rod, also known as the plunger, that goes into the solenoid should not be made of aluminum because it is not magnetic and will not respond to an electro-magnetic field and force created by the solenoid. Most stainless steel also is not magnetic and if it is not magnetic, then the portion of the plunger that goes into the solenoid, for the same reason, should not be made of it. The portion of the plunger that goes into the solenoid is preferably made of mild steel so that it will maximize the magnetic property of the solenoid and movement of its coil. If the valve is manual or gear driven or is driven by any other force or device that does not require a magnetic field, such as a vacuum, hydraulic, pneumatic or mechanical force, then the portion of the rod that goes into the solenoid need not preferably be made of mild steel, and it can optionally be made of the same material that the other components of the valve are made of, or of other materials. If the valve control or selector rod, also known as the plunger, is made of two or more sections composed of different materials, for example, one section is mild steel and an adjoining section is aluminum, then the two or more sections must be dielectrically isolated.

Needle valves, butterfly valves, gate valves, and other kinds of valves may be suitable for use as selector valves as between and among two or more different or distinct liquid fluids available to the valve, but due to their complexity and operational mechanics involved, often are not used for this purpose.

Some selector valves are pressure differential dependent. Typically, a pressure differential dependent valve is used when the fluid is gaseous, rather than liquid. A typical pressure differential dependent valve requires pressure on one side at all times to ensure a complete shut-off. If the pressure differential dependent valve does not always have pressure on this one side, then it may allow leakage or cross-contamination to occur as between or among two or more different or distinct liquid fluids available to the valve. If a valve is not pressure differential dependent, any other force besides pressure may be used to counterbalance the force or device driving the valve control or selector rod, also known as a plunger, and to keep the valve piston in its intended position. A spring is preferably used to counterbalance the driving force or device and return the plunger to its neutral or default position. If a solenoid is used as the driving force or device and the solenoid is capable of reversing magnetic poles, it can use the magnetic field to position the valve plunger and piston and it does not need a spring to counterbalance the solenoid and return it to a neutral or default position, but constant electrical power is required to maintain any valve position if such a reverse-polarity solenoid is used. If electrical power is cut to a solenoid-operated valve, then the valve piston position will move and float according to whichever side of it is subject to more pressure; there will no longer be a complete shut-off; and there will be leakage and cross-contamination as between two or more different or distinct liquid fluids available to the valve. If there is a spring acting as a counterbalance to an electrically charged solenoid, when electrical power is cut, then the force of the spring will cause the valve plunger and piston to automatically revert to their neutral or default position.

If the valve plunger is solenoid driven, there may be a spring at the opposite end of the plunger from the solenoid. In case of liquid fluid entering a valve cavity or fluid passageway that is under pressure, this spring can be made stiff and strong enough to be able to exert a counterbalancing pressure that will be strong enough to prevent the force of the liquid fluid from pushing the valve piston into a position that is not desired. If this spring is made to be more stiff, strong, and resistant to movement, then the solenoid has to be able to generate an electrical field that is, in turn, strong enough to be able to offset and overcome the spring tension without assistance from the force of the fluid. The tension of the spring thus sets the range of the head pressure for the liquid fluid or is calibrated to match the prevailing range of head pressures of the liquid fluid, and the electrical magnetic force of the solenoid is calibrated to match and counterbalance the spring tension.

If a valve is motor or screw driven, rather than solenoid driven, then precise control can be established to allow two or more different and distinct liquid fluids available to the valve to communicate in the valve's cavity or fluid passageway, with a set percentage of each liquid fluid communicating according to the degree to which the motor or screw is applied to move the control or selector rod, also known as the plunger, and the valve piston.

If the valve and its components are preferably made of metal, then they have the advantage of being better able to function correctly at higher temperature ranges than components made of plastic or mixed materials, which have a more limited operational range and may not be capable of functioning correctly and may degrade at higher temperatures. Metal components are more robust and durable than non-metal components. Because of the thermal conductivity of metal, a metal valve and components will also respond to heat exchange from an external source more rapidly and thoroughly than a non-metal valve and components. For examples, this external source may be electrical resistance creating heat or it may be liquid coolant routed from a heating source, such as a fuel oil burner or a spark ignition or compression ignition or other form of combustion engine, or a cooling source, such as a radiator or other air- or liquid-cooling exchange device.

If the valve manifold and valve pistons are all preferably made of the same kind of metal, then they will all expand and retract at the same rate when heated and cooled, best preserving the seals between them at all temperatures and preventing complications from different metallic expansion rates, such as seizure of the piston inside the valve cavity or fluid passageway.

A valve that requires a complete seal of one fluid available to the valve while permitting full flow of a different and distinct fluid available to the valve may demand more movement of the piston and a longer piston stroke than a solenoid operating as the driving force can feasibly deliver or allow. For a solenoid to move the valve piston in these circumstances, the solenoid would have to be comparatively bigger in size. Therefore, it would require additional electricity to activate it, which would render the solenoid operation of the valve impractical in an application, such as an engine mounted in a motor vehicle, which engine has only limited electrical amperage available to operate all of the electrical systems of the engine.

BRIEF SUMMARY OF THE INVENTION

The present invention comprises methods, systems, and apparatuses that can obtain positive flow control and a complete shut-off by the valve piston of a valve that has two or more different or distinct liquid fluids available to it, including one or more liquid fluids that may be a biofuel with a temperature above 85 degrees Fahrenheit, comprising, for instance, triglycerides, fatty acids, biodiesel, or renewable diesel.

DETAILED DESCRIPTION

Figure 1:
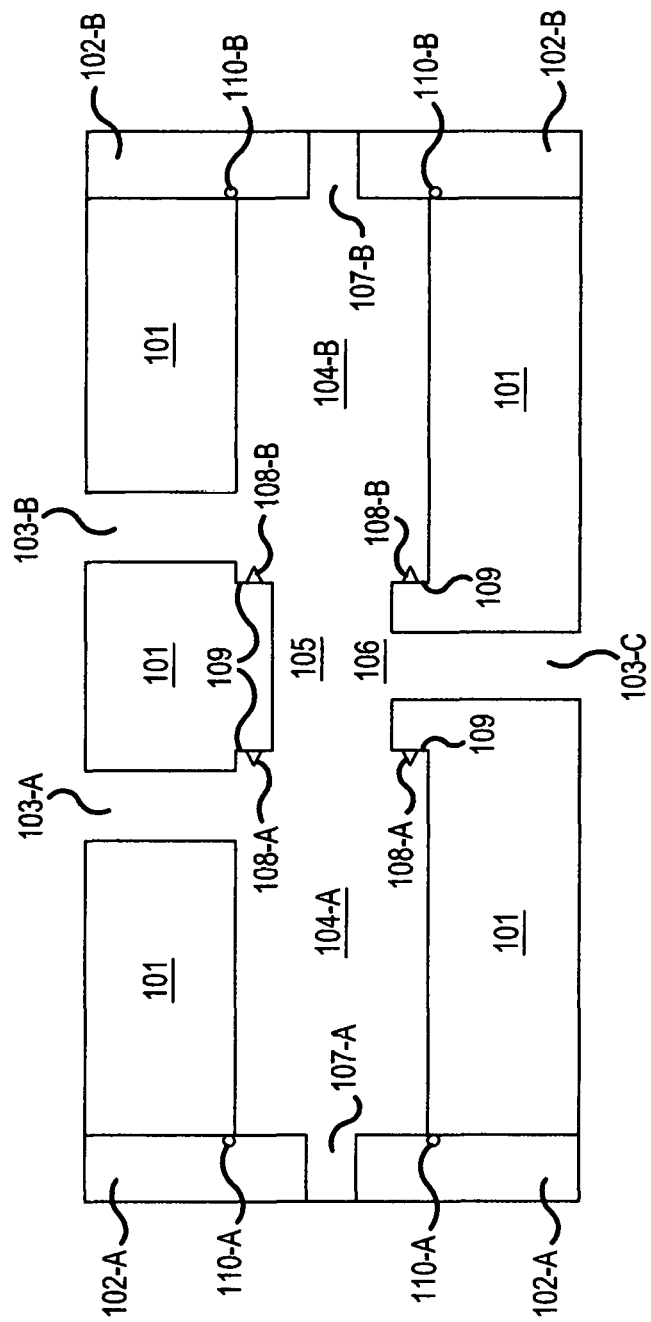
FIG. 1 is a cut-out illustration of the fluid or fuel ports, piston cylinders, a fluid or fuel passageway, a valve cavity, and actuation ports of a hydraulic, pneumatic or vacuum-activated dual piston valve system example embodiment of the present invention.

Exemplary embodiments of the present invention provide systems, methods and apparatuses that enable control of the flow and location of two or more different or distinct liquid fluids supplying a compression ignition engine that are available at low pressure to a valve, in particular, when one or more of the fluids is a liquid biofuel which may have a temperature exceeding 85 degrees Fahrenheit.

Hydraulic, pneumatic or vacuum force is a preferred method for permitting maximum movement of the valve piston to permit full flow of fuel, while also permitting a complete pressure seal. Even though a spring may be in place opposing the hydraulic or pneumatic force when the valve is changing states from activated position to default position, the valve piston encounters friction and stiction as it moves along the valve cylinder wall and the mass of the fluid it is having to move, all of which may slow the movement of the valve as it is moving to the default position. If the spring force is not properly calibrated to match the resistance of the mass of the fluid opposing it, this friction, stiction and mass may be so strong in magnitude as to prevent the valve piston from moving at all towards its default position. This slowed or halted movement of the piston valve towards its default position permits undesirable mixing inside the valve cavity or fluid passageway of the two or more distinct fuels available to the valve. Accordingly, to overcome and negate this slowed or halted movement of the piston and the possibility of undesirable fluid mixing, the function of the spring is boosted by additional force applied to support it. This additional force may be a vacuum drawing the piston valve towards its default position or it may be hydraulic or pneumatic force applied from the spring side of the valve and towards the valve piston's default position.

In an example of the embodiment described in part in the preceding paragraph, in which the valve has three ports and two distinct fuels available to it, hydraulic, pneumatic or vacuum force is applied on the valve alternately from and towards opposite directions. In its preferred embodiment, this kind of valve requires two pistons, one to block off each fuel supply when the other fuel supply is selected. The pistons activated by hydraulic, pneumatic or vacuum force communicate with each other by means of a rod between them, or such a rod connects to one or both pistons. The piston-and-rod assembly moves back and forth in response to the spring, hydraulic, pneumatic and vacuum force being applied to it and in response to the removal of such force. Like a poppet valve, this dual piston valve forms a positive stop as between two or more distinct fluids available to the valve and prevents cross-contamination between them. Like a ball valve, this dual piston valve allows full flow through the valve of the selected fluid, as among or between two distinct fluids available to the valve. Like a spool valve, this dual piston valve has a spring to return the valve to a default position in the case of intended or unintended loss of the force activating the valve. Like a pressure differential dependent valve, this dual piston valve operates by having pressure executed alternatively from either side of the valve; however, the pressure does not come from any of the fuels available to the valve, but from a hydraulic, pneumatic or vacuum source external to the valve that is not either of these fuels.

The medium for a hydraulic force can be any substance in a liquid form. The medium for any pneumatic force can be any substance in gaseous form. In an example embodiment described in the preceding paragraph, the medium for a hydraulic force may be brake fluid, transmission oil or radiator coolant fluid coming from a hydraulic cylinder or pump that is part of or affixed to a motor vehicle, locomotive, ship or engine, or it may be any such liquid coming from a separate and independent hydraulic cylinder or pump that is dedicated to the valve, or it may be coming from any other source, other than the fuel available to the valve. The medium for a pneumatic force may be any gas that becomes more highly pressurized, thereby through its container transmitting the force as work to the valve. The medium through which any pneumatic force travels may be air from the air brake pneumatic cylinder/air compressor, emissions exhaust, or any other gas coming from a pneumatic cylinder or pump that is part of or affixed to a motor vehicle, locomotive, ship or engine, or it may be any such gas coming from a separate and independent pneumatic cylinder or compressed storage that is dedicated to the valve, or it may be coming from any other source, other than the fuel available to the valve.

FIG. 1 is a cut-out illustration of the fluid or fuel ports, piston cylinders, fluid or fuel passageway, a valve cavity, and actuation ports of a hydraulic-, pneumatic- or vacuum-activated dual piston valve system example embodiment of the present invention. This embodiment comprises a valve body 101; end plates 102-A and 102-B; fluid or fuel ports 103-A, 103-B, and 103-C; piston cylinders 104-A and 104-B; a fluid or fuel passageway 105, which is located between the two piston cylinders 104-A and 104-B; valve cavity 106, comprising the total space including piston cylinders 104-A and 104-B and fluid or fuel passageway 105; and hydraulic, pneumatic or vacuum force actuation ports 107-A and 107-B. End plates 102-A and 102-B cover the entirety of opposite ends of valve body 101, and they cover the outer end of the cylindrical openings in valve body 101 formed by piston cylinders 104-A and 104-B. End plates 102-A and 102-B also enclose actuation ports 107-A and 107-B. Piston cylinders 104-A and 104-B are cylindrical in shape. O-rings or seals 110-A and 110-B seal piston cylinders 104-A and 104-B to prevent air and other media from unintentionally escaping from either of these piston cylinders through the joint between end plates 102-A and 102-B and valve body 101, which would compromise functionality of the valve. Elevated and pointed edges 108-A and 108-B extend from valve body 101 at the piston seat or inner ledge 109 of piston cylinders 104-A and 104-B. Elevated and pointed edges 108-A and 108-B extend around the circumference of piston seat or inner ledge 109. The cut-out FIG. 1 does not depict any valve pistons, any rod connecting the two valve pistons, any spring, and additional features of these particular components that, in a full depiction of this example embodiment of the valve system, would be present inside the total space comprising piston cylinders 104-A and 104-B, fluid or fuel passageway 105, and valve cavity 106.

Figure 2:
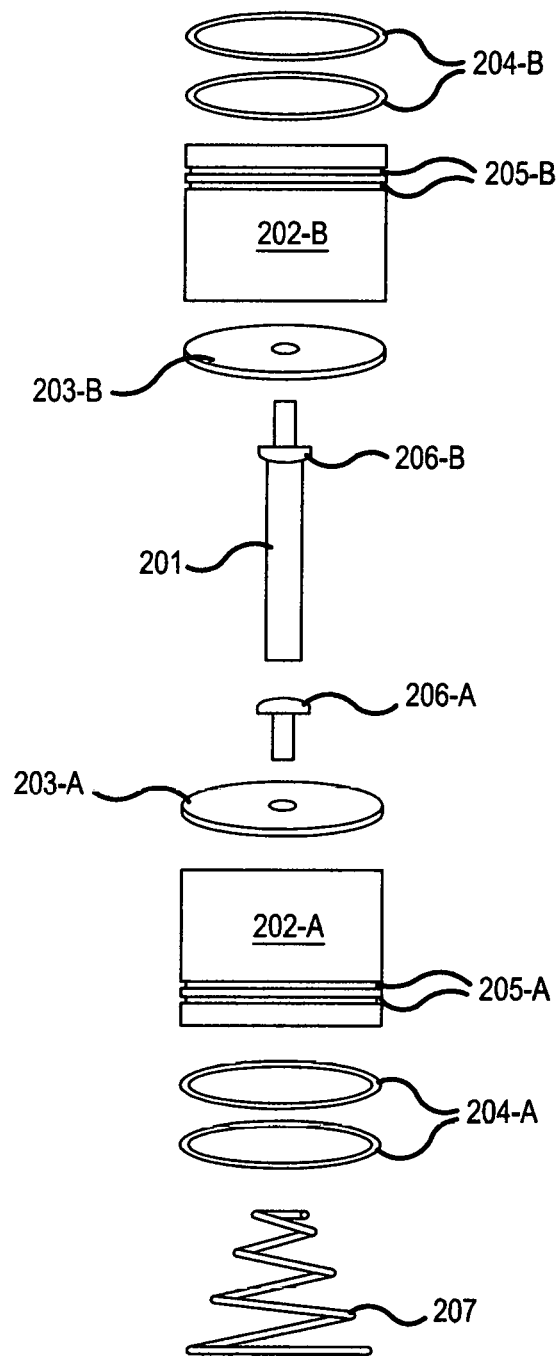
FIG. 2 is an exploded view illustration depicting the dual piston componentry of an example embodiment of the present invention.

In FIG. 2, washers 203-A and 203-B and O-rings or seals 204-A and 204-B are preferably made of a fluoropolymer elastomer such as VITON® or similar biofuel-compatible material, or they are made of material meeting the specifications for use of the particular, distinct fluids available to the valve.

In the example embodiment of the present invention depicted in FIG. 1, fluid or fuel is available to the valve preferably from fluid or fuel ports 103-A and 103-B and exits the valve preferably from fluid or fuel common exit port 103-C. Hydraulic, pneumatic or vacuum force enters the piston cylinders 104-A and 104-B from either of or both actuation ports 107-A and 107-B.

FIG. 2 is an exploded view illustration depicting the dual piston componentry of an example embodiment of the present invention. This componentry comprises a rod 201; pistons 202-A and 202-B, washer seals 203-A and 203-B; O-rings or seals 204-A and 204-B; grooves 205-A and 205-B on the surfaces of pistons 202-A and 202-B; and screw heads 206-A and 206-B. Rod 201 is connected to screw head 206-B. Rod 201 is preferably in communication with screw head 206-A and rod 201 may or may not be affixed to it. In addition, FIG. 2 depicts spring 207.

In FIG. 1, valve body 101 and end plates 102-A and 102-B are preferably made of metal and preferably made of aluminum or stainless steel. In FIG. 2, pistons 202-A and 202-B and rod 201 are preferably made of metal and preferably made of aluminum or stainless steel. Valve body 101, end plates 102-A and 102-B, pistons 202-A and 202-B, and rod 201 preferably are all made of the same material.

Figure 3:
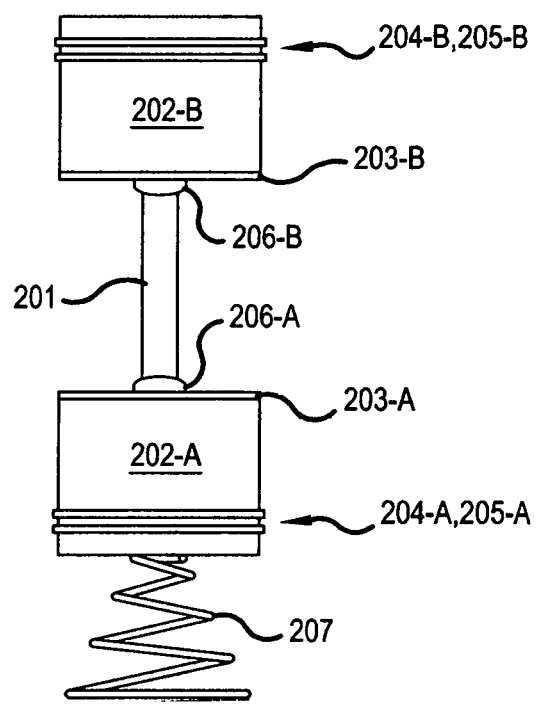
FIG. 3 is an illustration of the dual piston componentry, assembled, of an example embodiment of the present invention.

FIG. 3 is an illustration of the dual piston componentry, assembled, of an example embodiment of the present invention. In FIG. 3, screw heads 206-A and 206-B are screwed into pistons 202-A and 202-B, respectively, securing in place washer seals 203-A and 203-B between screw heads 206-A and 206-B, respectively, and pistons 202-A and 202-B, respectively. Washer seals 203-A and 203-B cover the surface of the inner end of pistons 202-A and 202-B, respectively. Rod 201 is affixed or connected to screw 206-B and rod 201 communicates with, and may or may not be connected to, screw 206-A. O-rings or seals 204-A and 204-B fit into grooves 205-A and 205-B, respectively, on the surfaces of pistons 202-A and 202-B. Spring 207 communicates with the outer end of piston 202-A, but is not affixed to it.

Figure 4:
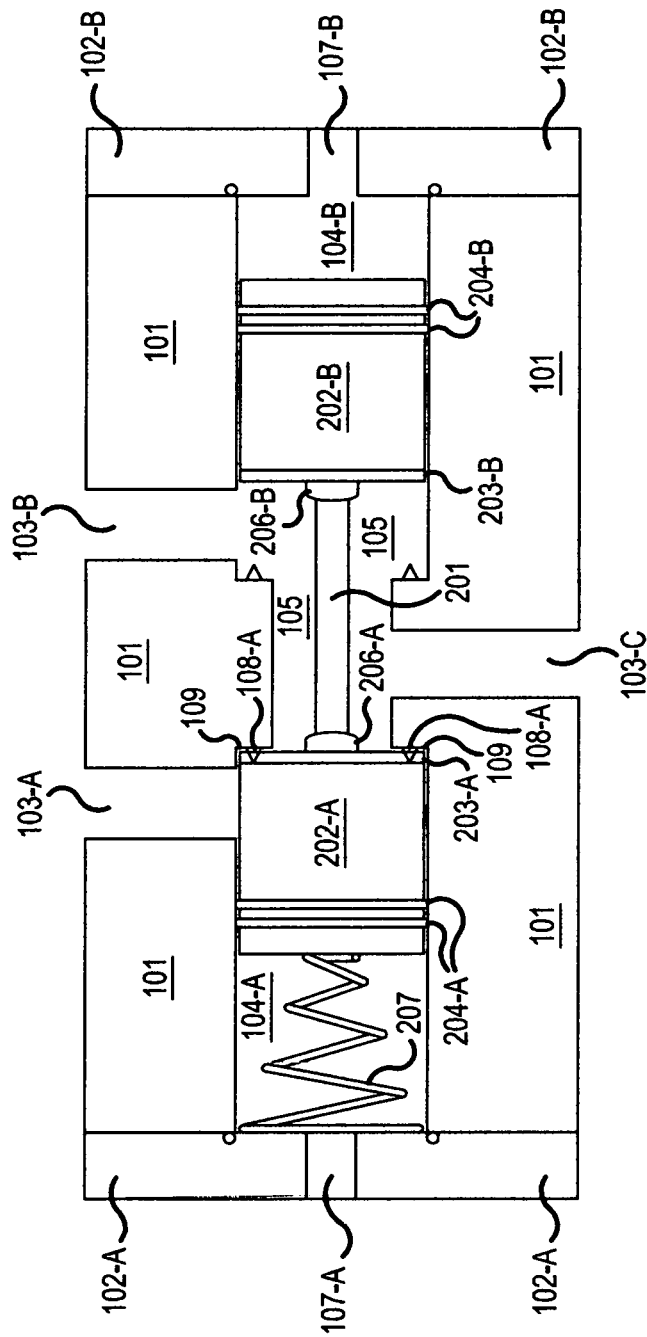
FIG. 4 is a cut-out illustration of a hydraulic, pneumatic or vacuum-activated dual piston valve system example embodiment of the present invention when the activating or actuating force is in its de-activated state and the valve has reached its de-activated or default position.

FIG. 4 is a cut-out illustration of a hydraulic, pneumatic or vacuum-activated dual piston valve system example embodiment of the present invention when the activating force is in its de-activated position. Fuel or fluid is available to the valve from fluid or fuel entry ports 103-A and 103-B. In this de-activated position, there is not any hydraulic or pneumatic force entering from actuation port 107-B to piston cylinder 104-B and therefore, there is not any hydraulic, pneumatic or vacuum force acting upon piston 202-B to move it towards actuation port 107-A at the opposite end of the valve body 101. In this de-activated position, spring 207 does not have any opposing hydraulic, pneumatic or vacuum force acting upon it and the force of spring 207 may be sufficient to cause piston 202-A, with which it communicates, to move inside valve cavity 104-A and towards actuation port 107-B at the opposite side of the valve assembly, as FIG. 4 depicts. In this de-activated position, hydraulic or pneumatic force has entered from actuation port 107-A to act on the outer end of piston 202-A and cause piston 202-A to move inside piston cylinder 104-A towards actuation port 107-B. In FIG. 4, piston 202-A is connected to screw head 206-A, which screw head 206-A is in communication with rod 201. The force of movement acting upon piston 202-A causes rod 201 to move piston 202-B, to which rod 201 is connected at screw head 206-B. Under the force of spring 207 and the hydraulic or pneumatic force entering from actuation port 107-A, piston 202-A moves towards the opposite side of valve body 101 until the inner end of piston 202-A encounters the barrier of piston seat 109, as depicted in FIG. 4. In FIG. 4, the force of movement transmitted through rod 201 has moved piston 202-B to the point that there is full flow of fluid or fuel entering fuel passageway 105 from entry port 103-B.

In the valve's default position depicted in FIG. 4, piston 202-A remains in communication with piston seat 109, as depicted, until the valve is put into an activated state, reversing the movement of the valve assembly, comprising pistons 202-A and 202-B and rod 201. Elevated and pointed edges 108-A form a seal with washer 203-A, which washer 203-A covers the inner end of piston 202-A. In this de-activated position, the seal formed both by the barrier of piston 202-A and the communication between washer 203-A and elevated and pointed edge 108-A completely shuts off the entry of fluid or fuel from entry port 103-A and prevents any and all such fluid or fuel from moving into fuel passageway 105 and on to fuel common exit port 103-C. In the de-activated position depicted in FIG. 4, fluid or fuel entering from entry port 103-B flows fully into fuel passageway 105 and exits the valve assembly at fuel common exit port 103-C. Upon the entry of fuel from fuel entry port 103-B, any fuel remaining in fuel passageway 105 or valve cavity 106 that had previously entered from fuel entry port 103-A is purged and exits the valve assembly at fuel common exit port 103-C.

As depicted in FIG. 4, the seal formed by the communication between washer 203-A and elevated and pointed edge 108-A prevents any and all fluid or fuel inside fuel passageway 105, which has entered from entry port 103-B, from passing by the barrier formed by piston 202-A and from entering either piston cylinder 104-A or entry port 103-A. In this de-activated or default position, there is not any commingling or mixing of or between the distinct fluid or fuel available to the valve from entry port 103-A and the distinct fluid or fuel available to the valve from entry port 103-B, and there is not any reservoir inside the valve cavity where fuels available to the valve from entry port 103-A and entry port 103-B commingle.

As depicted in FIG. 4, O-rings 204-A form a seal between piston 202-A and the wall of piston cylinder 104-A and thereby prevent any and all hydraulic, pneumatic or vacuum force and all air and other media passing from actuation port 107-A into piston cylinder 104-A from passing further around piston 202-A and entering fuel passageway 105. O-rings 204-A also form a seal further preventing any and all fluid or fuel inside fuel passageway 105 from passing by the barrier formed by piston 202-A and entering piston cylinder 104-A.

Figure 5:
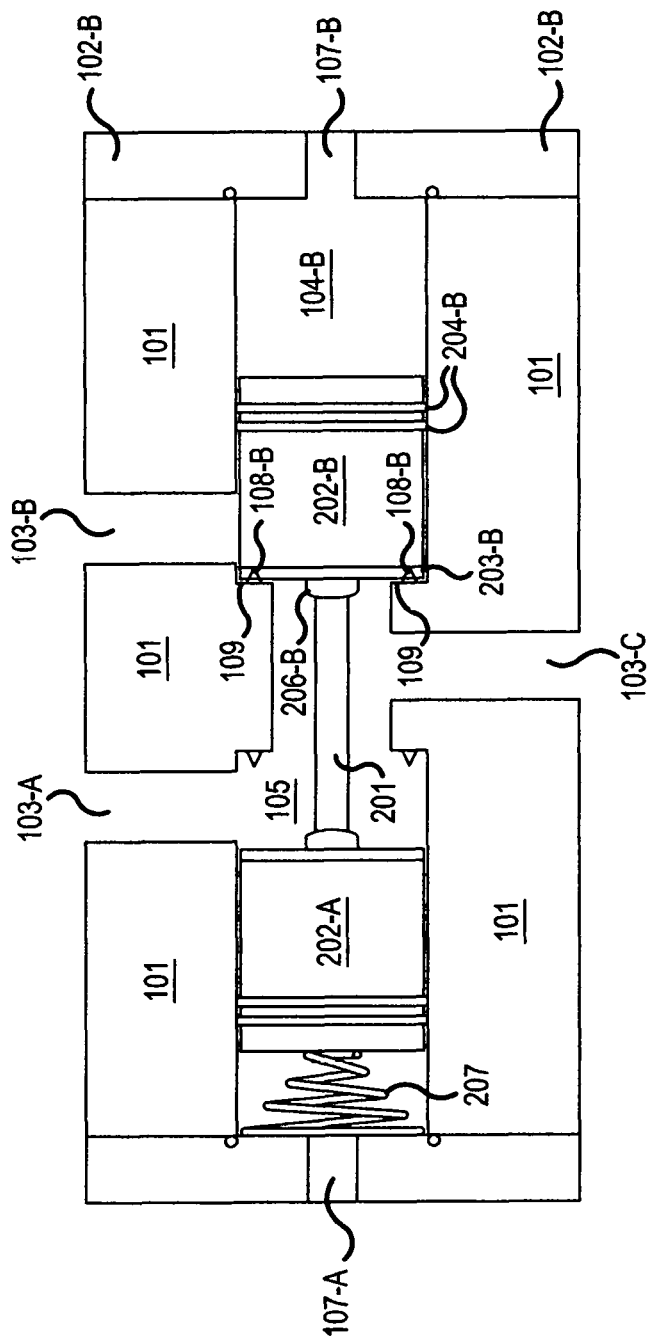
FIG. 5 is a cut-out illustration of a hydraulic, pneumatic or vacuum-activated dual piston valve system example embodiment of the present invention the activating force is in its activated or actuated state and the valve has reached its activated position.

FIG. 5 is a cut-out illustration of a hydraulic, pneumatic or vacuum-activated dual piston valve system example embodiment of the present invention when the activating force is in its activated position. Fuel or fluid is available to the valve from fluid or fuel entry ports 103-A and 103-B. In this activated position, hydraulic or pneumatic force entering from actuation port 107-B to piston cylinder 104-B has acted upon the outer end of piston 202-B to cause it to move inside piston cylinder 104-B towards actuation port 107-A at the opposite side of the valve assembly. This hydraulic or pneumatic force is sufficient to overcome the resistive inertia of spring 207 and to move the dual valve assembly, including both pistons 202-A and 202-B and rod 201, towards spring 207. The force of movement acting upon piston 202-B causes rod 201 to move piston 202-A, to which rod 201 is connected at screw head 206-B. Under the force of the hydraulic or pneumatic force entering from actuation port 107-B, piston 202-B moves towards actuation port 107-A at the opposite side of the valve body, causing spring 207 to compress, until the inner end of piston 202-B encounters the barrier of piston seat 109 as depicted in FIG. 5.

Elevated and pointed edges 108-B form a seal with washer 203-B, which washer 203-B covers the inner end of piston 202-B.

In FIG. 5, the force of movement transmitted through rod 201 has moved piston 202-A to the point that there is full flow of fluid or fuel entering fuel passageway 105 from entry port 103-A.

In this dual piston valve system's activated position depicted in FIG. 5, the seal formed both by the barrier of piston 202-B and the communication between washer 203-B and elevated and pointed edge 108-B completely shuts off the entry of fluid or fuel from entry port 103-B and prevents any and all such fluid or fuel from moving into fuel passageway 105 and on to fuel common exit port 103-C. In the activated position depicted in FIG. 5, fluid or fuel entering from entry port 103-A flows fully into fuel passageway 105 and exits the valve assembly at fuel exit port 103-C. Upon the entry of fuel from fuel entry port 103-A, any fuel remaining in fuel passageway 105 or valve cavity 106 that had previously entered from fuel entry port 103-B is purged and exits the valve assembly at fuel common exit port 103-C.

As depicted in FIG. 5, the seal formed by the communication between washer 203-B and elevated and pointed edge 108-B prevents any and all fluid or fuel inside fuel passageway 105, which has entered from entry port 103-A, from passing by the barrier formed by piston 202-B and from entering either piston cylinder 104-B or entry port 103-B. In this activated position, there is not any commingling or mixing of or between the distinct fluid or fuel available to the valve from entry port 103-B and the distinct fluid or fuel available to the valve from entry port 103-A, and there is not any reservoir inside the valve cavity where fuels available to the valve from entry port 103-A and entry port 103-B commingle.

As depicted in FIG. 5, O-rings 204-B form a seal between piston 202-B and the wall of piston cylinder 104-B and thereby prevent any and all hydraulic, pneumatic or vacuum force and all air and other media passing from actuation port 107-B into piston cylinder 104-B from passing further around piston 202-B and entering fuel passageway 105. O-rings 204-B also form a seal further preventing any and all fluid or fuel inside fuel passageway 105 from passing by the barrier formed by piston 202-B and entering piston cylinder 104-B.

In the valve's activated position depicted in FIG. 5, piston 202-B remains in communication with piston seat 109, as depicted, until the hydraulic or pneumatic force entering from actuation port 107-B is removed. Once this hydraulic or pneumatic force entering from actuation port 107-B is removed, the force of spring 207 and any additional hydraulic or pneumatic force entering from actuation port 107-A is sufficient to overcome the resistive force of the fluid in fuel passageway 105 and reverse the movement of the dual valve assembly, including pistons 202-A and 202-B and rod 201, as a result of which they move towards actuation port 107-B.

In an alternative example embodiment of the present invention depicted in FIG. 5, vacuum force entering from actuation port 107-A, instead of or in supplement to hydraulic or pneumatic force entering from actuation port 107-B, serves as a or the motivating force drawing the dual valve assembly, including pistons 202-A and 202-B and rod 201, towards actuation port 107-A, thereby causing spring 207 to compress.

Figure 8:
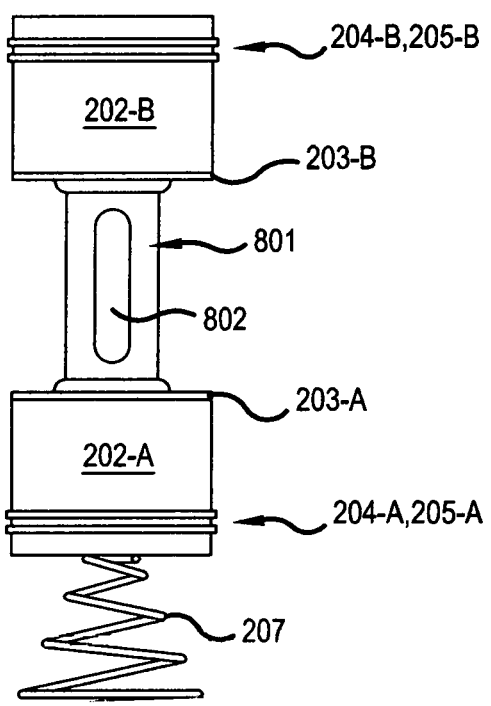
FIG. 8 is an illustration of dual piston componentry of an alternative example embodiment of the present invention in which the selected input fuel passes solely through an aperture in the pistons' connecting rod to reach the fuel's exit port.
Figure 9:
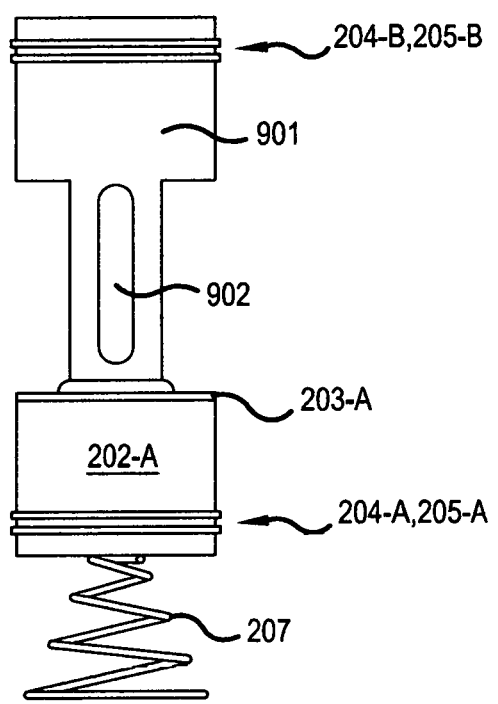
FIG. 9 is an illustration of dual piston componentry of an alternative example embodiment of the present invention in which the selected input fuel passes solely through an aperture in one of the pistons to reach the fuel's exit port.
Figure 10:
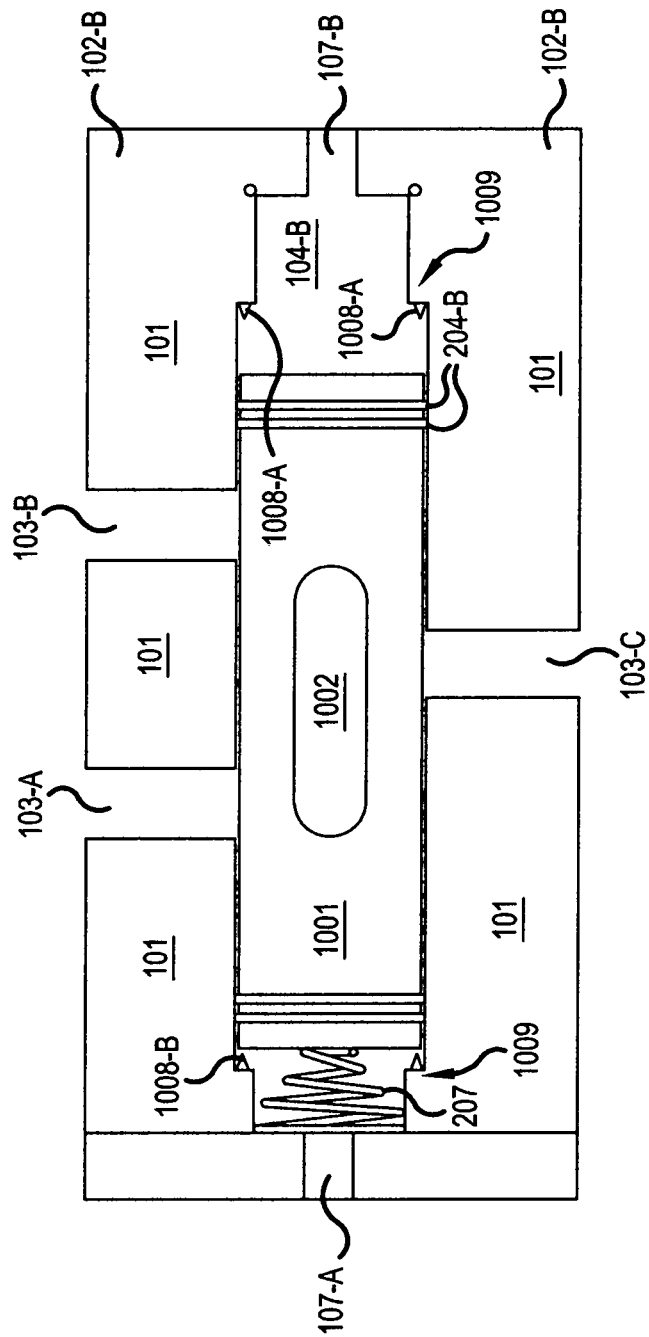
FIG. 10 is a cut-out illustration of an alternative shuttle valve example embodiment of the present invention in which the fuel passes solely through an aperture in the shuttle valve to reach the fuel's exit port, the activating force is in its hydraulic, pneumatic or vacuum activated or actuated state, and the valve has reached its activated position.

As depicted in FIG. 4 and FIG. 5, rod 201 has a cross-sectional area that is less than the cross-sectional area of fuel passageway 105 and allows fuel to pass around it. In an alternative embodiment of the present invention, rod 201 has a cross-sectional area that is substantially similar to the cross-sectional area of the narrowest point of fuel passageway 105 and has an aperture permitting fuel entering the valve from whichever of fuel entry ports 103-A and 103-B that the aperture is aligned with to pass to the fuel common exit port 103-C. In this alternative embodiment, the function that rod 201 performed in the preferred embodiment is embodied in rod 801 in FIG. 8. Fuel does not pass around rod 801 and can only pass by it by passing through aperture 802, which may be one or more apertures, to reach fuel common exit port 103-C. Aperture 802 is open only to one or the other of fuel entry ports 103-A or 103-B at a time, while rod 801 blocks fuel from the other entry port from passing through the valve to fuel common exit port 103-C. In another alternative embodiment, depicted in FIG. 9, rod 801 and piston 202-B are combined into one piston 901, by and through which fuel can only pass via aperture 902, which may be one or more apertures, to reach fuel common exit port 103-C. Aperture 902 is open only to one or the other of fuel entry ports 103-A or 103-B at a time, while piston 901 blocks fuel from the other entry port from passing through the valve to fuel common exit port 103-C. In another alternative embodiment, depicted in FIG. 10, shuttle 1001 embodies the combined function of dual pistons 202-A and 202-B and rod 201 from the preferred embodiment and shuttle 1001 has a cross-sectional area that is substantially similar to the cross sectional area of pistons 104-A and 104-B. In this alternative embodiment, aperture 1002, which may be one or more apertures, is the only passageway by which fuel can pass from either fuel entry port 103-A or 103-B to fuel common exit port 103-C while shuttle 1001 blocks the other fuel entry port. Shuttle 1001 seats on either of its end surfaces at the piston seat or inner ledge 1009 of piston cylinders 104-A and 104-B, and elevated and pointed edges 1008-A and 1008-B extend from valve body 101 at the piston seat or inner ledge 1009 of piston cylinders 104-A and 104-B.

Figure 6:
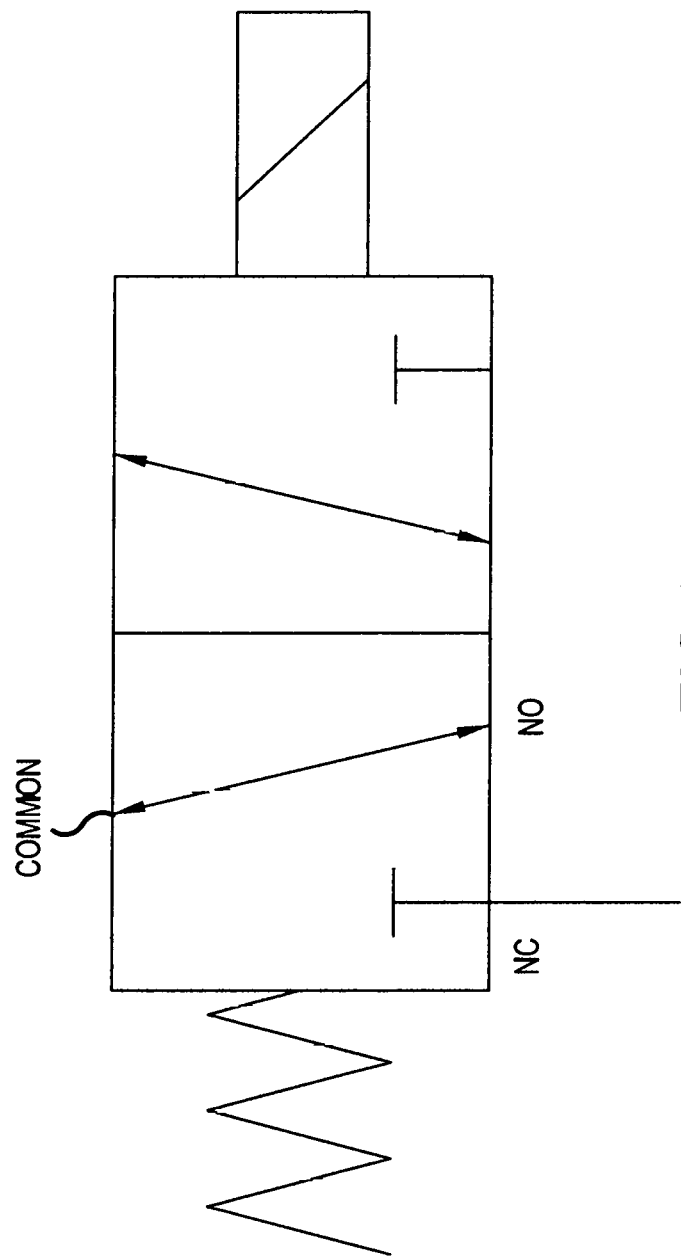
FIG. 6 is a mechanical functional representation of a schematic illustration of the electrical wiring of a solenoid-activated poppet valve system according to an example embodiment of the present invention.

FIG. 6 is a mechanical functional representation of a schematic illustration of the electrical wiring of a solenoid-activated poppet valve system according to an example embodiment of the present invention. It depicts, as an example, the fluid flow from the fluid's port of entry to the valve (labeled "1" or "common") to fluid port 2, which is by default open. Fluid port 3 is normally closed in this example illustration, unless the solenoid is activated, in which case fluid port 2 is closed and fluid port 3 is open. The solenoid is representative of any force or device that drives the valve, including hydraulic, pneumatic or vacuum force.

Figure 7:
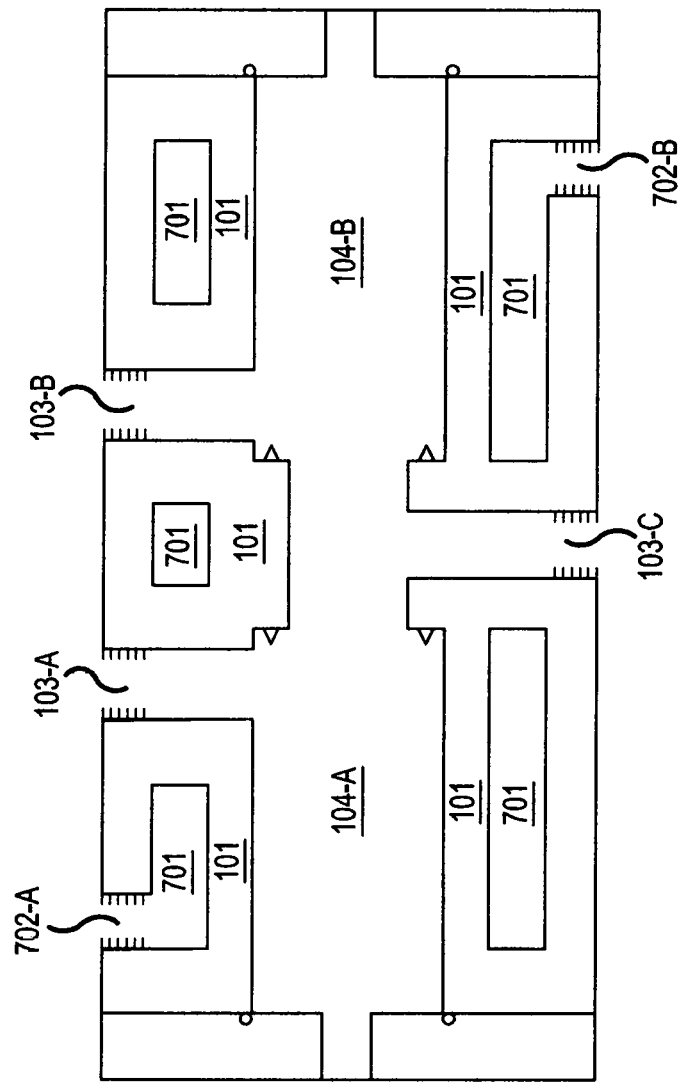
FIG. 7 is a cut-out illustration depicting an example of a passageway for fluid distinct from any of the fuel passageways that heats or cools the valve body by thermal transfer, in an example embodiment of the present invention.

FIG. 7 is a cut-out illustration depicting an example of a passageway for fluid distinct from any of the fuel passageways that heats or cools the valve body by thermal transfer, in an example embodiment of the present invention. Thermal transfer fluid passageway 701 lies fully enclosed within valve body 101. Thermal transfer fluid passageway 701 has, as an example, ports 702-A and 702-B at the surface of valve body 101, which ports 702-A and 702-B allow the entry to and exit from valve body 101 of thermal transfer fluid enclosed within valve body 101 inside fluid passageway 701. In an embodiment of the present invention which is a combustion engine, thermal transfer fluid is preferably coolant from the engine that serves primarily to heat the valve body and thereby, one or both of the distinct liquid fuels available to and passing through the valve system.

In addition to thermal fluid passageway ports 702-A and 702-B, FIG. 7 depicts fuel entry ports 103-A and 103-B and fuel common exit port 103-C. All fluid ports 702-A, 702-B, 103-A, 103-B, and 103-C are preferably threaded with threads 703 to receive and securely hold in place fittings attaching or appending one or more fluid hosing passageways (not depicted in FIG. 7) that are external to the valve system and valve body 101. Such external fluid, hosing passageways alternatively receive fluids from an external source and allow such fluids to communicate with entry ports 702-A, 103-A, or 103-B to valve body 101 or such external fluid hosing passageways allow fluids exiting valve body 101 from fluid exit ports 702-B and 103-C to travel elsewhere in such external fluid passageways. In addition, passageway 601-A, depicted in FIG. 6, has a port at the surface of the side of end plate 102-A that is similarly tapped and threaded, as does the comparable passageway for hydraulic, pneumatic or vacuum force in end plate 102-B (not depicted in FIG. 6).

INDUSTRIAL APPLICABILITY

For example, an embodiment of the present invention will find use in a dual-tank fuel system that enables a fuel oil burner or compression ignition combustion engine to operate alternately on (i) petrochemical fuel, which petrochemical fuel may be petrochemical diesel fuel or gasoline, and (ii) biofuel, which biofuel may consist of triglycerides, fatty acids, biodiesel, non-ester renewable diesel, or ethanol. In such a fuel system, the burner or engine starts and shuts down operation drawing its fuel supply from a fuel tank dedicated to holding petrochemical fuel, but in the interim, the burner or engine draws its fuel supply from an alternate tank, which may hold biofuel or a combination of petrochemical fuel and biofuel (henceforth, any such combination is "multifuel," a definition including the combination of pure biofuel and no petrochemical fuel). The multifuel is heated by heat exchangers to reduce its viscosity so that it will exhibit more of a finely atomized spray pattern, and thereby produce a cleaner and more efficient burn, upon release through a fuel injector into either, if a burner, a flame, or if a combustion ignition engine, the cylinder combustion chamber. For example, an embodiment of the present invention will find use in a dual-tank fuel system that enables a fuel oil burner or compression ignition combustion engine to operate alternately on (i) petrochemical fuel, which petrochemical fuel may be petrochemical diesel fuel, No. 1 or No. 2 diesel fuel satisfying ASTM Standard Specification D-975, or gasoline, and (ii) biofuel, which biofuel may consist of triglycerides, fatty acids, biodiesel, non-ester renewable diesel (hydro-processed esters and fatty acids), or ethanol.

Such a dual-tank fuel system requires one or more valves to determine which one of the two different or distinct liquid fluid fuel supplies, as between petrochemical fuel and multifuel, will supply the burner or engine at any particular point in time. Since pure or 100% petrochemical fuel is required and used as a solvent to flush and eliminate the burner or engine fuel lines of multifuel upon burner or engine shutdown and then to start up the burner or engine subsequently with pure or 100% petrochemical fuel upon its re-start, safe and clean operation of the burner or engine may require that the petrochemical fuel supply not become contaminated with any multifuel at any point within the fuel system, including the valves. In addition, if any multifuel enters the petrochemical fuel lines coming from the petrochemical fuel tank by cross-leakage at the valve, the multifuel will contaminate the petrochemical fuel stored in the petrochemical fuel tank. Since the dual tank fuel system does not heat the fuel coming from the petrochemical fuel tank before it enters the fuel injectors, the contaminating multifuel will remain more viscous than the petrochemical fuel and perhaps even in solid, particle form, raising the risk of prematurely plugging the petrochemical fuel filter and if it passes by this filter, possibly causing a blockage in a fuel injector and damaging it.

Therefore, the valve must be capable of obtaining a complete shut-off by the valve piston of the liquid fluid cavity or fluid passageway, as between the two different or distinct liquid fluids available to the valve, petrochemical fuel and multifuel. For the same reason of protecting and safeguarding the burner or engine from operating on multifuel when the conditions for such use are not optimal for the burner or engine, it is advisable that the valve automatically revert to a petrochemical fuel-only mode of operation when the force activating the valve is, for any unintended reason, cut to the valve. The same considerations about protecting the burner or engine may merit or require petrochemical fuel-only operation when the multifuel consists in part or all of gaseous or liquid fluid dimethyl ester, propane, methane, and fuels obtained from pyrolysis or the Fischer-Tropsch process. Full flow of the selected fuel through the valve is preferred so as to enable smooth and uninhibited operation of the engine or burner in response to command controls. Hence, hydraulic, pneumatic or vacuum force as the activating force of a dual piston valve system with a spring to return the valve to its default position when such force is unintentionally cut is preferred. The hydraulic, pneumatic or vacuum activating force must be applied in a controlled manner in response to the preferred conditions for supplying alternately petrochemical fuel or multifuel to the engine. Therefore, the medium for transmission of the hydraulic activating force is preferably other than emissions exhaust gas, which exhaust gas is not available when the engine is not in operation and therefore, may not be able to transmit activating force when the engine is shut down. Similarly, the medium for transmission of the pneumatic activating force is preferably other than either of the fuels available to the valve, because a supply of one or both of these fuels may not be available at all times to serve as the valve's actuating pneumatic force.

Since in such a dual-tank fuel system, the multifuel consisting in part or all of a biofuel is heated and the controls for the dual-tank fuel system may not allow the burner or engine to draw multifuel until the multifuel and all components within the fuel system, including the one or more valves, have attained a specific temperature at or above 85 degrees Fahrenheit, it is beneficial and preferable that the fuel system components, including the valves, that are in communication with the multifuel attain the specific temperature at or above 85 degrees Fahrenheit as soon as technically possible and safe after the start-up of the burner or engine. It is also beneficial and preferable that the fuel system components, including the one or more valves, which are in communication with the multifuel maintain a specific minimum temperature threshold that is preferably at or above 85 degrees Fahrenheit. Therefore, it is beneficial or preferable that all of the components be made of metal, which conducts thermal transfer better than plastic and other materials, and preferably inexpensive aluminum, or else stainless steel, which materials are less reactive with biofuel than are mild steel, copper and brass. To preserve the valve piston's ability at all operational temperatures to obtain a complete shut-off of the liquid fluid cavity or fluid passageway, as between the two different or distinct liquid fluids available to the valve, petrochemical fuel and multifuel, it is preferable that the valve piston be made of the same metallic material as the valve body so that they will have the same thermal expansion rates where they come into communication with each other. It is also preferable that the valve piston and valve plunger seals and O-rings be made of biofuel-compatible fluoropolymer elastomer such as VITON® or some other biofuel-compatible sealing material.

The fuel contained in fluid passageways available to such a valve affixed to or part of a compression ignition engine or its fuel system is available to the valve at pressure of less than 100 pounds per square inch (psi), that is, low pressure.

The typical fuel lift pump in a diesel engine petrochemical fuel system pushes or draws the fuel from the fuel storage tank towards the engine by pressurizing the fuel typically to around 25 psi to move it forward through the fuel filter(s) and fuel lines to the high pressure fuel injection pump. The high pressure fuel injection pump causes the fuel's pressure continuing to move forward to increase substantially prior to and at the point of injection into the fuel combustion cylinder chamber. The high pressure fuel injection pump raises the fuel's pressure continuing to move forward to anywhere from several hundred psi to 35,000 psi or more, depending on the type of fuel injection system. If the fuel lift pump is moving a diesel engine fuel, such as plant hydrocarbon oil or triglycerides, that has a higher viscosity than petrochemical diesel fuel at a given temperature, then the fuel lift pump will typically operate at and pressurize the fuel to 65 psi to move the higher viscosity fuel forward. A high performance fuel lift pump may have the capability of generating 100 psi of fuel pressure. A pressure range of up to 100 psi is appropriate in case the triglyceride fuel happens to be especially viscous, for instance if it is near its pour point, and requires additional pressure to go through the fuel filter(s) and advance towards the high pressure fuel injection pump.

The system can operate substantially as described in connection with the examples of FIGS. 4 and 5. It is contemplated that the use of the invention can involve components having different sizes, provided the components are all scaled together. The scope of the invention may be defined by the claims below.

What is claimed is:

1. A method comprising the following steps:
   providing a valve having at least two positions and three ports, said valve includes a first cylinder and a second cylinder with a common fuel passageway between the first and second cylinders, a first piston operatively mounted within the first cylinder, a second piston operatively mounted within the second cylinder and a rod operatively connected to the first piston and the second piston, said rod being positioned within the common fuel passageway;
   controlling and containing fluid flow as between or among two different and distinct liquid fuels supplied to the valve at a pressure of less than 100 pounds per square inch;
   producing, when the valve is in an actuated position, a flow of a first of the two fuels through a first fluid port to the common fuel passageway and to a common exit port and a complete shut-off of a second fluid port by the second piston of a second of the two fuels available to the valve;
   producing, when the valve is in a default position, a flow of the second of the two fuels through the second fluid port to the common fuel passageway and to the common exit port and a complete shut-off of the first fluid port by the first piston of the first of the two fuels available to the valve;
   permitting the two fuels to commingle only when one fuel purges the other fuel in replacing it leading to a common exit port of the valve; and
   providing an actuation port at an outer end of at least one of the first and second cylinders for applying a force for moving the valve from its default position to its actuated position that is a hydraulic or pneumatic force, whose source can only be other than the first and second fuels available to the valve, said force acting on the valve coming from the direction of the default position and moving towards the actuated position, or that is a vacuum force, acting on the valve drawing from the direction of the actuated position.

2. The method of claim 1, further comprising a spring for returning the valve to the default position when a force acting on the valve and opposing the spring is removed.

3. The method of claim 1, wherein a hydraulic, pneumatic or vacuum force, whose source can only be other than the fuels available to the valve, acts on the valve to move it from the actuated position to the default position.

4. The method of claim 1, further comprising a separate fluid passageway, distinct from any of the fuel passageways, that is enclosed within a portion of the valve body and is capable of holding a fluid that is capable of heating or cooling the valve body through thermal transfer.

5. A system for controlling and containing fluid flow to a valve as between or among two different and distinct liquid fuels supplying a compression ignition engine available to the valve at a pressure of less than 100 pounds per square inch, comprising:

two cylinders with a common fuel passageway between them, each cylinder housing a piston;

a rod in communication with the two pistons, the rod passing through and contained within the common fuel passageway;

three fluid ports, which together with the two piston cylinders and the common fuel passageway between the piston cylinders, comprise a valve cavity, one fluid port containing a first kind of fuel available for entry to the valve, a second fluid port containing a second kind of fuel available for entry to the valve, and the third fluid port of which exits the valve cavity from the common fuel passageway between the piston cylinders and which third fluid port is available to either one of the two fuels, depending on the position of the valve;

the rod connected to a center of an inner end of at least one piston and in communication with a center of an inner end of the second piston, which piston ends are at an angle that is perpendicular to the rod;

the pistons moving as the rod moves and altogether as one piston-and-rod assembly;

when the valve is in a default position, one piston completely closing off the first fuel's entry port while the other piston allows a flow of the second fuel through the valve coming from the second fuel's entry port;

when the valve is in an actuated position, one piston completely closing off the second fuel's entry port while the other piston allows a flow of first fuel through the valve coming from the first fuel's entry port, and;

an actuation port at the outer end of at least one of the piston cylinders allowing vacuum, hydraulic or pneumatic force whose source is other than the fuels available to the valve to act on the outer end of the piston;

wherein the first and second fuels commingle only when one purges the other in replacing it leading to the common exit port.

6. The system of claim 5, wherein a spring sits at an outer end of one of the piston cylinders, with a spring force returning the rod and pistons to the default position when all vacuum, hydraulic and pneumatic force from a source other than the fuels available to the valve is removed.

7. The system of claim 5, wherein each piston cylinder has a seat at its inner end that prevents the piston from moving further towards the center of the valve cavity.

8. The system of claim 7, wherein each seat has a pointed edge around its complete circumference extending from the seat towards the washer seal on the inner end of the piston.

9. The system of claim 5, wherein the surface of the inner end of each of the pistons facing the rod is covered with a washer seal.

10. The system of claim 5, wherein each piston has two or more O-rings or seals encircling its circumference near the outer end of the piston, which O-rings or seals prevent fuel inside the valve cavity from reaching the actuation port and which O-rings or seals prevent the medium through which vacuum, hydraulic or pneumatic force travels from comingling with fuel inside the valve cavity.

11. The system of claim 5, further comprising a valve body, rod and pistons that are all made of aluminum.

12. The system of claim 9, wherein the washer seals are made of a biofuel-compatible material.

13. The system of claim 10, wherein all the O-rings are made of a biofuel-compatible material.

14. The system of claim 5, further comprising, contained within a portion of the valve body, a separate and additional passageway that is capable of holding a fluid capable of heating or cooling the valve body through thermal transfer.

15. The system of claim 5, further comprising a valve body, rod and pistons that are all made of stainless steel.

* * * * *